United States Patent
Amemura

(10) Patent No.: US 8,930,658 B2
(45) Date of Patent: Jan. 6, 2015

(54) ELECTRONIC EQUIPMENT SYSTEM AND STORAGE DEVICE

(75) Inventor: Tatsuaki Amemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 13/421,098

(22) Filed: Mar. 15, 2012

(65) Prior Publication Data

US 2012/0246431 A1    Sep. 27, 2012

(30) Foreign Application Priority Data

Mar. 23, 2011  (JP) ................................. 2011-064818

(51) Int. Cl.
G06F 12/00  (2006.01)
G06F 21/79  (2013.01)
G06F 21/81  (2013.01)

(52) U.S. Cl.
CPC ................ *G06F 21/79* (2013.01); *G06F 21/81* (2013.01)
USPC ..... 711/163; 711/100; 711/154; 711/E12.001

(58) Field of Classification Search
USPC ........................... 711/100, 154, 163, E12.001
See application file for complete search history.

(56) References Cited

U.S. PATENT DOCUMENTS

| 2003/0137887 A1 | 7/2003 | Nakabe et al. |
| 2010/0235575 A1 | 9/2010 | Yasaki et al. |
| 2010/0250836 A1* | 9/2010 | Sokolov et al. ............... 711/103 |
| 2011/0208913 A1* | 8/2011 | Suzuki et al. .................. 711/115 |

FOREIGN PATENT DOCUMENTS

| JP | 04-071090 | 3/1992 |
| JP | 2003-288564 A | 10/2003 |
| JP | 2006-107244 A | 4/2006 |
| JP | 2007-133770 A | 5/2007 |
| JP | 2009-075959 | 4/2009 |
| JP | 3151486 | 6/2009 |
| JP | 2010-238216 A | 10/2010 |
| JP | 2010-265553 | 11/2010 |
| JP | 2011-031031 | 2/2011 |
| JP | 2011-054580 | 3/2011 |

* cited by examiner

*Primary Examiner* — Midys Rojas
(74) *Attorney, Agent, or Firm* — Renner, Otto, Boisselle & Sklar, LLP

(57) ABSTRACT

In electronic equipment 1, a limitation level on reading data from a USB flash drive (storage device) 2 is set to a setting section 3 in advance. The USB flash drive 2 ascertains the setting at the setting section 3 when connected to the electronic equipment 1 and limits reading data based on the determined setting. If the limitation level does not match with the condition for permitting data read-out as determined in USB flash drive 2, the USB flash drive 2 prohibits the electronic equipment 1 from reading out data. By executing the processing for limiting data read-out at the side of the USB flash drive 2, unauthorized leakage of data can easily be prevented.

5 Claims, 9 Drawing Sheets

F I G. 1
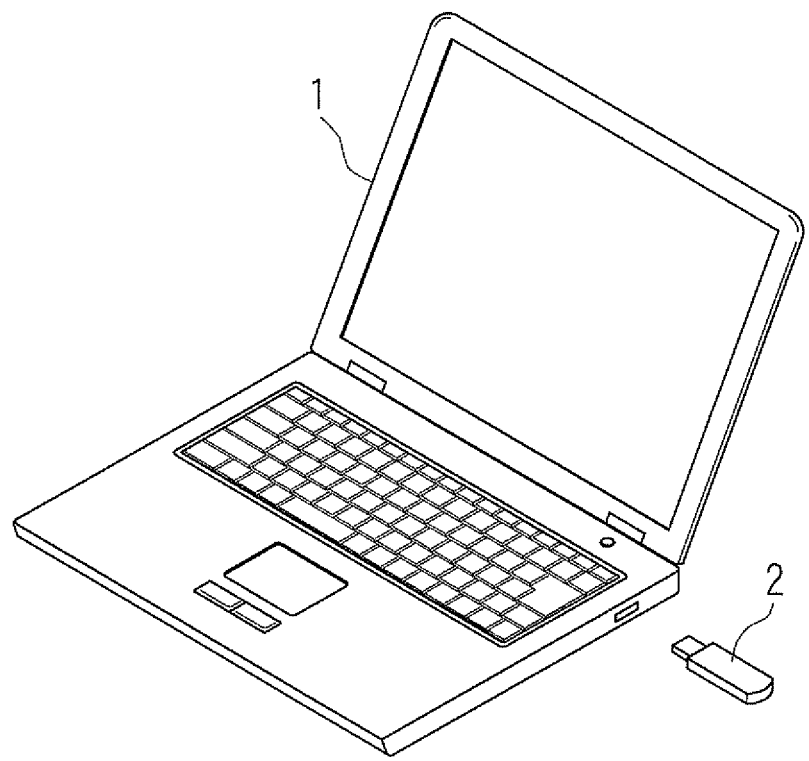

F I G. 3
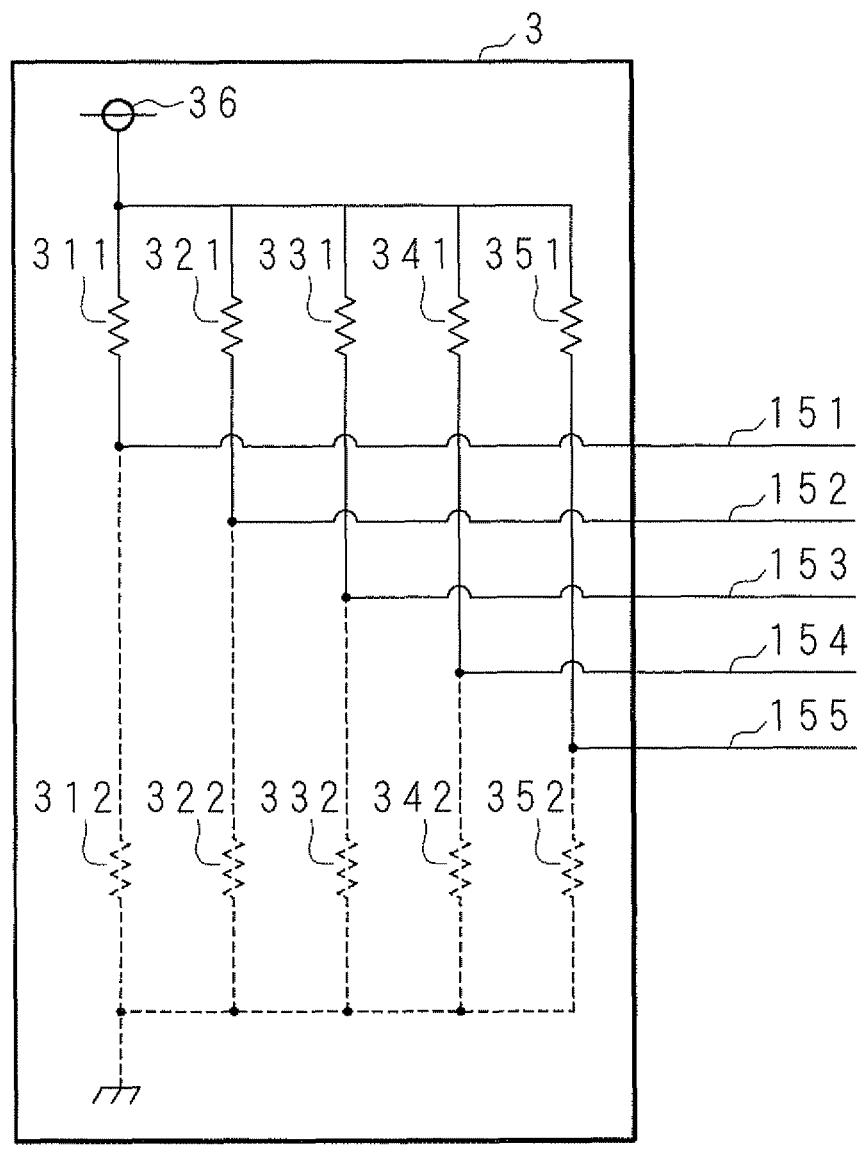

FIG. 5

| LIMITATION LEVEL | PERMITTED OR PROHIBITED TO READ OUT DATA |
|---|---|
| {1,1,1,1,1} | PERMITTED |
| OTHER THAN {1,1,1,1,1} | PROHIBITED |

FIG. 8

| LIMITATION LEVEL | PERMITTED OR PROHIBITED TO READ OUT DATA |
|---|---|
| {1,1,1,1,1} | PERMITTED FROM ALL THE MEMORY SECTION |
| {1,1,1,1,0} ~ {0,1,1,1,1} | PERMITTED FROM THE FIRST MEMORY SECTION |
| {1,1,1,0,0} ~ {0,1,1,1,0} | PERMITTED FROM THE SECOND MEMORY SECTION |
| OTHERS | PROHIBITED |

ELECTRONIC EQUIPMENT SYSTEM AND STORAGE DEVICE

CROSS-REFERENCE TO RELATED APPLICATIONS

This Nonprovisional application claims priority under 35 U.S.C.§119(a) on Patent Application No. 2011-064818 filed in Japan on Mar. 23, 2011, the entire contents of which are hereby incorporated by reference.

BACKGROUND

1. Technical Field

The present invention relates to an electronic equipment system including electronic equipment and a storage device connected to the electronic equipment, and also relates to the storage device.

2. Description of Related Art

Electronic equipment such as a notebook PC (Personal Computer) is often connected to an external device and is provided with a connection interface performing data transfer between the electronic equipment and the device. The connection interface may supply power to the device in addition to data transfer. An example of the connection interface includes a USB (Universal Serial Bus). Japanese Utility Model Registration No. 3151486 discloses USB 3.0 for an example of the connection interface. A device compliant with USB, if it is a power-saving device, may be used only by connecting it to electronic equipment without the need for another power supply. Because of its versability, USB is employed in a number of types of devices. Specifically, a USB flash drive connected to electronic equipment by USB can easily be portable and has been widespread in general because of its lowered cost and increased volume.

SUMMARY OF THE INVENTION

Due to the high convenience of the USB flash drive, however, unauthorized leakage of data may easily occur when such a USB flash drive is used. There is a measure against the unauthorized leakage of data, which stores special software in a USB flash drive and makes electronic equipment execute the software. This, however, may require complicated setting or a password, generating troublesome work which may often be disfavored. Furthermore, a number of limitations in use arise such as limitation of the OS (Operating System) in the electronic equipment which can use the USB flash drive with such a measure.

The present invention has been contrived in view of the above circumstances. An object of the present invention is to provide an electronic equipment system and a storage device that can easily prevent unauthorized leakage of data by controlling data read-out at the side of the storage device connected to the electronic equipment.

In an electronic equipment system according to the present invention including electronic equipment and a storage device connected to the electronic equipment and data is read out from the storage device, the electronic equipment includes a setting section having set a limitation level on reading out data from the storage device, and the storage device includes a limitation storage section for storing concrete limitation in accordance with a limitation level, a ascertainment section for ascertaining the limitation level set at the setting section when the storage device is connected to the electronic equipment, and a limitation section for limiting reading data in accordance with the concrete limitation and the limitation level ascertained by the ascertainment section.

In the electronic equipment system according to the present invention, the limitation storage section stores a range of a limitation level for permitting reading data. The limitation section includes a permission section for permitting reading data if the limitation level ascertained by the ascertainment section falls within the range, and a prohibition section for prohibiting reading data if the limitation level ascertained by the ascertainment section does not fall within the range.

In the electronic equipment system according to the present invention, the electronic equipment further includes a first power supply section for supplying electric power to the storage device connected to the electronic equipment. The storage device further includes a data output section for reading out and outputting data to the electronic equipment, and a second power supply section for supplying electric power from the first power supply section to the data output section. The permission section makes the second power supply section supply electric power to the data output section if the limitation level ascertained by the ascertainment section falls within the range. The prohibition section makes the second power supply section prohibit power supply to the data output section if the limitation level ascertained by the ascertainment section does not fall within the range.

In the electronic equipment system according to the present invention, the storage device further includes a plurality of data storage sections. The limitation storage section stores some range of a limitation level for permitting reading data from each of the plurality of data storage section. The limitation section includes a permission section for permitting reading data from one or more specific data storage sections and for prohibiting reading data from the other data storage sections if the limitation level ascertained by the ascertainment section falls within the range of the limitation level for permitting reading data from the specific data storage sections, and a prohibition section for prohibiting reading data from the plurality of data storage sections if the limitation level ascertained by the ascertainment section does not fall within any range of the limitation level for permitting reading data from each of the plurality of data storage sections.

A storage device according to the present invention, from which data is read out by an outside section, includes: a limitation storage section for storing concrete limitation for limiting reading data in accordance with a state of the outside section; a ascertainment section for ascertaining the state of the outside section; and a limitation section for limiting reading data in accordance with the state of the outside section ascertained by the ascertainment section and with the concrete limitation.

According to an aspect of the present invention, when the storage device is connected to the electronic equipment, the storage device ascertains the setting of the electronic equipment and executes processing for limiting the electronic equipment in reading out data from the storage device. By executing the processing of limiting data read-out at the storage device side, the electronic equipment does not have to execute special software.

According to another aspect of the present invention, the storage device permits the electronic equipment to read out data if the setting of the electronic equipment matches with the condition for permitting data read-out determined at the storage device. The storage device prohibits the electronic equipment from reading out data if the setting of the electronic equipment does not match with the condition for permitting data read-out determined at the storage device.

According to another aspect of the present invention, the storage device prohibits power supply to the data storage section and to the data output section that perform processing of reading out data, when it prohibits reading data. Prohibition of power supply makes it impossible to execute the processing for reading data, allowing reliable prohibition of data read-out.

According to another aspect of the present invention, the storage device includes a plurality of data storage sections. A condition is determined for permitting data read-out from each of the data storage sections, to individually permit or prohibit data read-out from each data storage section in accordance with the setting for the electronic equipment. Accordingly, authorization for data read-out is set in multiple stages at the electronic equipment.

According to another aspect of the present invention, the storage device prohibits power supply to the data storage section for which data read-out is to be prohibited, when data read-out from the data storage section is prohibited. The power supply is prohibited, making it impossible to execute the processing of reading out data, and thus reliably prohibiting data read-out.

According to a further aspect of the present invention, when connected to the electronic equipment, the storage device is connected to the setting section of the electronic equipment with a signal line used for the interface performing data transmission and ascertains the setting of the electronic equipment through the signal line. Thus, the processing for limiting data read-out is surely executed at hardware.

The present invention prevents unidentified electronic equipment from reading out data from the storage device, preventing unauthorized leakage of data. There is no need for executing special software at the electronic equipment and thus troublesome work can be avoided, easily preventing unauthorized leakage of data. Furthermore, necessary processing is executed at the storage device side, generating less limitation such as limitation in OS of the electronic equipment. The present invention therefore produces a beneficial effect.

The above and further objects and features of the invention will more fully be apparent from the following detailed description with accompanying drawings.

BRIEF DESCRIPTION OF THE SEVERAL VIEWS OF THE DRAWINGS

FIG. 1 is a conceptual view illustrating the appearance of an electronic equipment system of the present invention;

FIG. 3 is a circuit diagram illustrating the first example of the internal configuration of a setting section;

FIG. 5 is a conceptual view illustrating an example of limitation in data read-out in accordance with a limitation level;

FIG. 8 is a conceptual view illustrating an example of stored contents in a storage section in Embodiment 2.

DETAILED DESCRIPTION

Embodiment 1

FIG. 1 is a conceptual view illustrating the appearance of an electronic equipment system of the present invention. The electronic equipment system of the present invention includes electronic equipment 1 such as a notebook PC, a game machine or the like and a USB flash drive 2. The USB flash drive 2 is a storage device which can be attached or detached to/from the electronic equipment 1, and the electronic equipment 1 writes and reads data to/from the storage device when the device is connected thereto.

Figure 2:
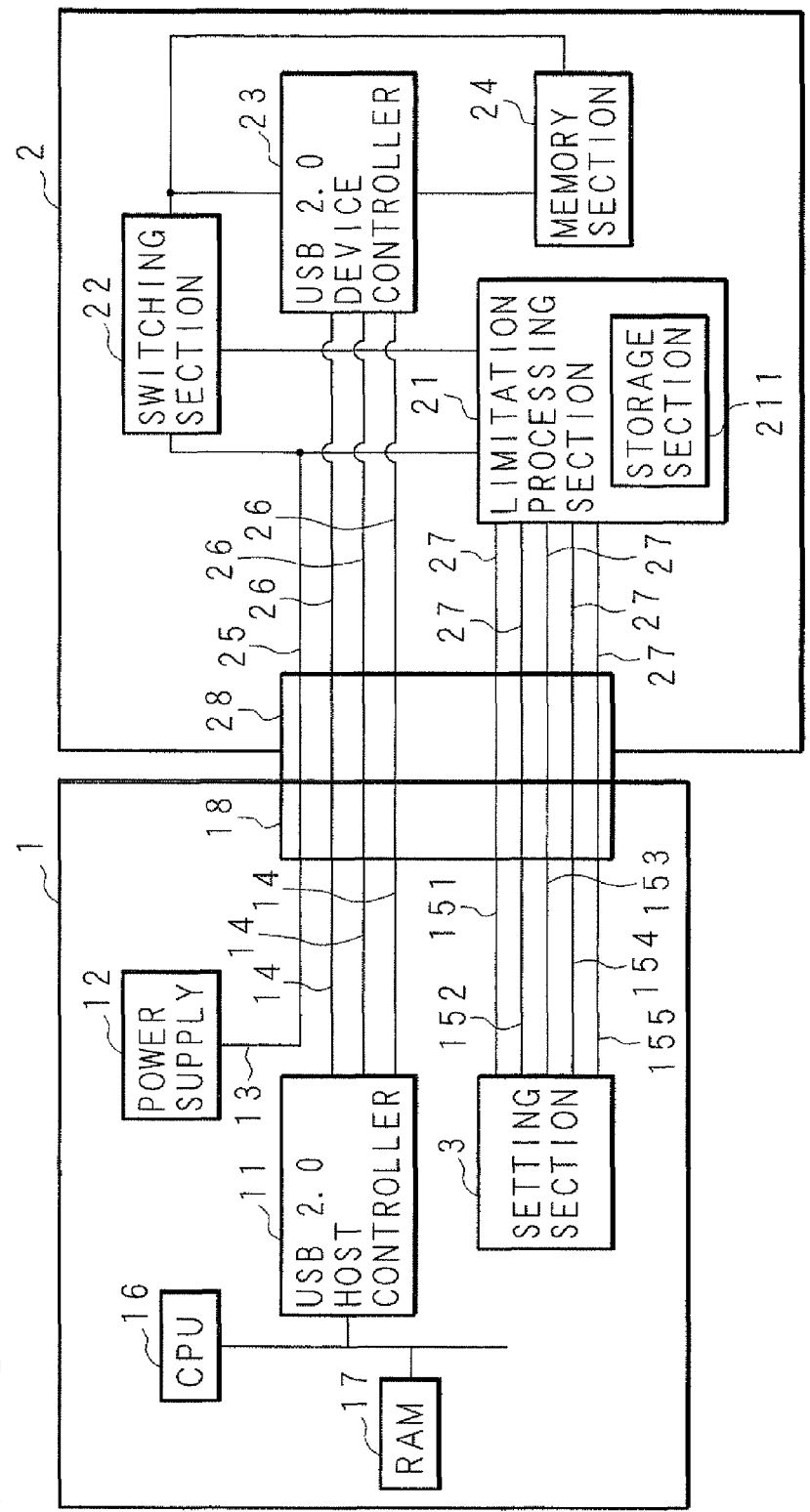
FIG. 2 is a block diagram illustrating the internal functional configuration of electronic equipment and USB flash drive included in the electronic equipment system according to Embodiment 1.

FIG. 2 is a block diagram illustrating the internal functional configuration of the electronic equipment 1 and the USB flash drive 2 included in the electronic equipment system according to Embodiment 1. The electronic equipment 1 includes a USB 3.0 socket 18 which is a connector for connecting the USB flash drive 2 thereto. The USB 3.0 socket 18 is a connector compliant with USB 3.0 which is an interface for inputting/outputting data. The USB 3.0 is an interface for inputting/outputting data using nine signal lines. Nine signal lines are connected to the USB 3.0 socket 18. Moreover, USB 3.0 has backward compatibility with USB 2.0. The USB 2.0 is an interface for inputting/outputting data using four signal lines. Among nine signal lines connected to the USB 3.0 socket 18, four signal lines are used for USB 2.0. The four signal lines used for USB 2.0 include a power line 13 as well as three signal lines 14, 14 and 14. Furthermore, the nine signal lines connected to the USB 3.0 socket 18 include five signal lines 151, 152, 153, 154 and 155 that are not used for USB 2.0.

The power line 13 is connected to a power supply 12 which supplies power to the USB flash drive 2 connected to the USB 3.0 socket 18. The signal lines 14, 14 and 14 are connected to the USB 2.0 host controller 11. The USB 2.0 host controller 11 executes processing of data input/output at the host side in accordance with a communication protocol for USB 2.0. The electronic equipment 1 further includes a setting section 3 in which a limitation level indicating the level of limiting data read-out from the USB flash drive 2 is set in advance. The setting section 3 is connected to signal lines 151, 152, 153, 154 and 155. Details of the setting section 3 will be described later. The USB 2.0 host controller 11 is connected to a CPU (Central Processing Unit) 16 which executes information processing required for the electronic equipment 1. The CPU 16 is connected to a RAM (Random Access Memory) which stores data generated along with the information processing. The CPU 16 is additionally connected to various devices (not shown), such as a display, for executing various types of processing required for the electronic equipment 1.

The USB flash drive 2 includes a USB 3.0 plug 28 which is a connector for connecting the USB 3.0 socket 18 thereto. The USB 3.0 plug 28 is a connector compliant with USB 3.0 and is connected to nine signal lines. Among the nine signal lines, four signal lines used for USB 2.0 include a power line 25 as well as three signal lines 26, 26 and 26. Moreover, the nine signal lines connected to the USB 3.0 plug 28 include five signal lines 27, 27, . . . that are not used for USB 2.0. The USB flash drive 2 includes a USB 2.0 device controller 23 executing processing of data input/output on the device side in accordance with the communication protocol for USB 2.0. The USB 2.0 device controller 23 corresponds to the data output section in the present invention. The USB 2.0 device controller 23 is connected to the signal lines 26, 26 and 26. Furthermore, the USB 2.0 device controller 23 is connected to a memory section 24 which is a non-volatile semiconductor memory such as a flash memory.

The USB flash drive 2 further includes a limitation processing section 21 performing the process of limiting the operation of the USB 2.0 device controller 23 and memory section 24 in accordance with the limitation level set at the setting section 3. The limitation processing section 21 is configured with a microcontroller including a processor and a memory for storing a program required for operation and temporary information associated with the operation as well as an input terminal and an output terminal for signals. The limitation processing section 21 corresponds to the ascertainment section and the limitation section in the present invention. The limitation processing section 21 includes a storage section (limitation storage section) 211 which stores concrete limitation for data read-out in accordance with a limitation level. The input terminal of the limitation processing section 21 is connected to five signal lines 27, 27, . . . . Note that the limitation processing section 21 may be configured with PLD (Programmable Logic Device) or a general-purpose logic IC. The limitation processing section 21 may also be configured with plural ICs.

In addition, the limitation processing section 21 is connected to the power line 25. The limitation processing section 21 is supplied with power from the electronic equipment 1 through the power line 25. Furthermore, the power line 25 is connected to a switching section 22 for switching between supplying and cutting of the power for the USB 2.0 device controller 23 and the memory section 24. The switching section 22 is connected to the USB 2.0 device controller 23 and memory section 24 by the power line. The switching section 22 performs processing for switching between supplying and cutting of the power supplied through the power line 25 to the USB 2.0 device controller 23 and memory section 24. The switching section 22 corresponds to the second power-supplying section in the present invention. The switching section 22 is configured with, for example, a FET (Field Effect Transistor). The power is supplied to the USB 2.0 device controller 23 and memory section 24 when FET is turned on, while the power is cut off therefrom when FET is turned off. The switching section 22 is connected to the limitation processing section 21 through the signal line, the limitation processing section 21 controlling the operation of the switching section 22.

FIG. 3 is a circuit diagram illustrating the first example of the internal configuration of the setting section 3. The setting section 3 includes a constant potential point 36 connected to a power supply (not shown). The setting section 3 includes either a pull-up resistance 311 connected to the constant potential point 36 or a pull-down resistance 312 connected to the ground. A signal line 151 is connected to either pull-up resistance 311 or pull-down resistance 312. In the state where the signal line 151 is connected to the pull-up resistance 311, the potential of the signal line 151 becomes high. On the other hand, when the signal line 151 is connected to the pull-down resistance 312, the potential of the signal line 151 becomes low. The high potential is assumed as a signal of "1" whereas the low potential is assumed as a signal of "0." In other words, the signal line 151 outputs "1" when it is connected to the pull-up resistance 311, whereas the signal line 151 outputs "0" when it is connected to the pull-down resistance 312.

Likewise, the setting section 3 includes either a pull-up resistance 321 or a pull-down resistance 322. A signal line 152 is connected to either pull-up resistance 321 or pull-down resistance 322. The setting section 3 also includes either a pull-up resistance 331 or a pull-down resistance 332. A signal line 153 is connected to either pull-up resistance 331 or pull-down resistance 332. The setting section 3 further includes either a pull-up resistance 341 or a pull-down resistance 342. A signal line 154 is connected to either pull-up resistance 341 or pull-down resistance 342. Moreover, the setting section 3 includes either a pull-up resistance 351 or a pull-down resistance 352. A signal line 155 is connected to either pull-up resistance 351 or pull-down resistance 352.

When the pull-up resistances 311, 321, 331, 341 and 351 indicated by solid lines in FIG. 3 are mounted, the signal lines 151, 152, 153, 154 and 155 output $\{1, 1, 1, 1, 1\}$. If, on the other hand, the pull-down resistances 312, 322, 332, 342 and 352 are mounted, the signal lines 151, 152, 153, 154 and 155 output $\{0, 0, 0, 0\}$. By mounting either the pull-up resistances or pull-down resistances connected to the respective signal lines, the setting section 3 is set to output any one of the $2^5$ signals from $\{0, 0, 0, 0, 0\}$ to $\{1, 1, 1, 1, 1\}$. The signal output by the setting section 3 indicates the limitation level. The setting section 3 has an internal circuit determined in advance to output a signal indicating a predetermined limitation level.

Figure 4:
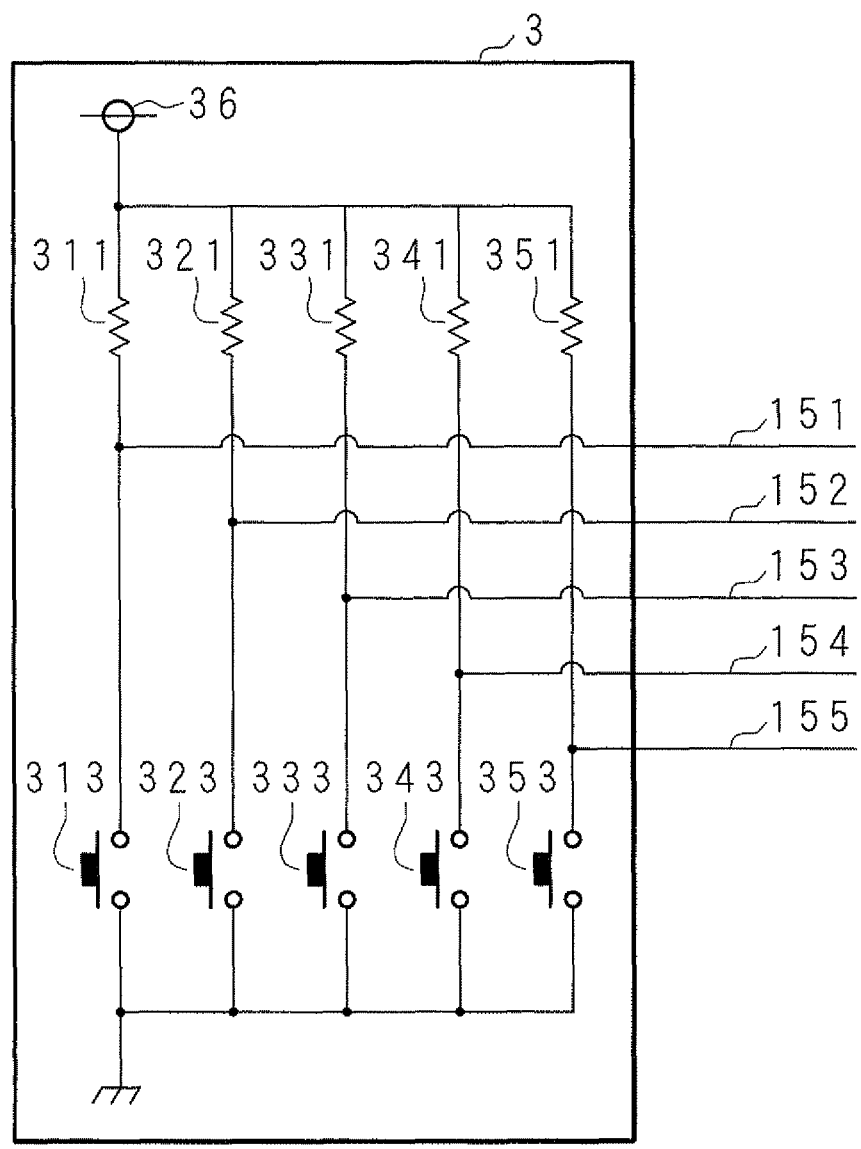
FIG. 4 is a circuit diagram illustrating the second example of the internal configuration of the setting section.

FIG. 4 is a circuit diagram illustrating the second example of the internal configuration of the setting section 3. The setting section 3 includes the pull-up resistance 311 and a pull-down switch 313, which are connected to the signal line 151. As shown in FIG. 4, when the pull-down switch 313 is turned off, the potential of the signal line 151 becomes high, outputting "1." When, on the other hand, the pull-down switch 313 is turned on, the potential of the signal line 151 becomes low, outputting "0." Similarly, the setting section 3 includes pull-up resistances 321, 331, 341 and 351 as well as pull-down switches 323, 333, 343 and 353. The signal line 152 is connected to the pull-up resistance 321 and pull-down switch 323. The signal line 153 is connected to the pull-up resistance 331 and pull-down switch 333. The signal line 154 is connected to the pull-up resistance 341 and pull-down switch 343. The signal line 155 is connected to the pull-up resistance 351 and pull-down switch 353.

By switching "on" and "off" of each of the pull-down switches 313, 323, 333, 343 and 353, the setting section 3 is set to output any one of the $2^5$ signals from $\{0, 0, 0, 0, 0\}$ to $\{1, 1, 1, 1, 1\}$. If, for example, all of the pull-down switches 313, 323, 333, 343 and 353 are turned off as shown in FIG. 4, the signals of $\{1, 1, 1, 1, 1\}$ are output. In other words, at the setting section 3, the limitation level is determined in accordance with whether each of the pull-down switches 313, 323, 333, 343 and 353 are "on" or "off." The setting section 3 is set in advance to output a signal indicating a predetermined limitation level. Note that the setting section 3 may have a configuration in which each pull-down switch is so fixed as not to change the limitation level, or a configuration in which the limitation level can be changed by switching "on" and "off" of each pull-down switch using a DIP switch or the like.

Though FIGS. 3 and 4 show the examples where all of the five signal lines 151, 152, 153, 154 and 155 are used to output a signal of a limitation level, the setting section 3 may alternatively take a form of outputting a signal of the limitation level using a part of the signal lines. The setting section 3 may, for example, use only the signal line 151 to output "0" or "1." The setting section 3 may also be configured with a non-volatile memory in which digital data indicating the limitation level is stored. The setting section 3 with such a configuration has the limitation level set by storing specific digital data, and the limitation level is read out through any one of the signal lines 151, 152, 153, 154 and 155. This configuration allows more variations of limitation levels than $2^5$ levels to be set. The setting section 3 may also have a configuration in which digital data indicating the limitation level can or cannot be rewritten.

The USB 3.0 plug 28 is connected to the USB 3.0 socket 18, so that the electronic equipment 1 is connected to the USB flash drive 2. In the state where the electronic equipment 1 is connected to the USB flash drive 2, the USB 2.0 host controller 11 is connected to the USB 2.0 device controller 23 through the signal lines 14, 14, 14 and the signal lines 26, 26, 26. Moreover, the limitation processing section 21 is connected to the setting section 3 through the signal lines 151, 152, 153, 154, 155 and signal lines 27, 27, . . . . Furthermore, electric power is supplied from the power supply 12 to the limitation processing section 21 and the switching section 22 through the power lines 13 and 25.

FIG. 5 is a conceptual view illustrating an example of limitation in data read-out in accordance with a limitation level. The storage section 211 stores therein information indicating the range of limitation levels which permits the electronic equipment 1 to read out data from the memory section 24. In the example shown in FIG. 5, when the signals indicating the limitation level correspond to {1, 1, 1, 1, 1}, reading data is permitted. When the signals indicating the limitation level corresponds to a combination other than {1, 1, 1, 1, 1}, reading data is prohibited. In the configuration where the setting section 3 is formed with a non-volatile memory, the storage section 211, for example, stores specific data for the limitation level at which the electronic equipment 1 is permitted to read out data from the memory section 24.

Figure 6:
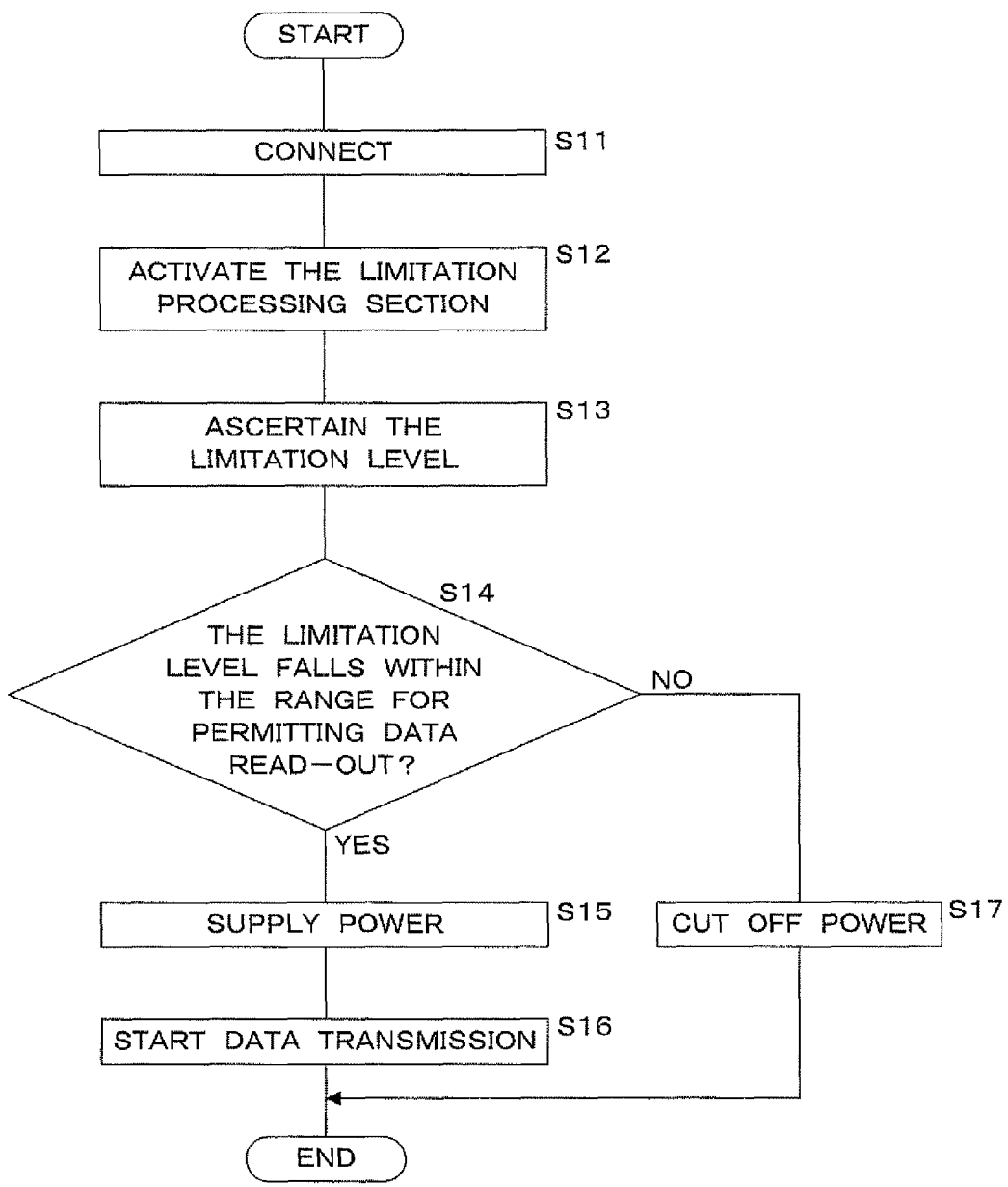
FIG. 6 is a flowchart illustrating the procedure of processing performed when the USB flash drive is connected to the electronic equipment in Embodiment 1.

FIG. 6 is a flowchart illustrating the procedure of processing performed when the USB flash drive 2 is connected to the electronic equipment 1 in Embodiment 1. The USB 3.0 plug 28 is connected to the USB 3.0 socket 18, so that the electronic equipment 1 is connected to the USB flash drive 2 (S11). The electric power from the power supply 12 is supplied through the power lines 18 and 25 to the limitation processing section 21, to activate the limitation processing section 21 (S12). The limitation processing section 21 accepts signals indicating the limitation level by detecting the potential of each of the connected signal lines 27, 27, . . . , to ascertain the limitation level set at the setting section (S13). Note that, in the configuration where the setting section 3 corresponds to a non-volatile memory storing digital data, the limitation processing section 21 reads out data indicating the limitation level from the setting section 3 at step S13, to ascertain the set limitation level. The limitation processing section 21 subsequently refers to the stored contents in the storage section 211 and determines whether or not the ascertained limitation level falls within the range for permitting data read-out from the memory section 24 (S14).

If, for example, the storage section 211 stores the condition shown in FIG. 5 and the signals indicating the limitation level are {1, 1, 1, 1, 1}, the limitation processing section 21 determines that the ascertained limitation level falls within a range which permits the data to be read out. Moreover, if the signals indicating the limitation level is other than {1, 1, 1, 1, 1} such as {0, 0, 0, 0, 0} for example, the limitation processing section 21 determines that the ascertained limitation level does not fall within the range which permits the data to be read out. Moreover, also when the signal accepted at step S13 is an unidentified signal, the limitation processing section 21 determines that the ascertained limitation level does not fall within the range which permits the data to be read out. Furthermore, in the case where the setting section 3 is configured with a non-volatile memory, the limitation processing section 21 determines that the limitation level falls within the range which permits data to be read out when the ascertained limitation level matches with the limitation level stored in the storage section 211. In the configuration, the limitation processing section 21 determines that the limitation level does not fall within the range which permits the data to be read out when the ascertained limitation level does not match with the limitation level stored in the storage section 211.

If, at step S14, the limitation level falls within the range which permits the data to be read out (S14: YES), the limitation processing section 21 makes the switching section 22 supply the electric power from the power supply 12 to the USB 2.0 device controller 23 and memory section 24 (S15). More specifically, the limitation processing section 21 makes the switching section 22 configured with FET switch to the "on" state. The electric power is supplied to the USB 2.0 device controller 23 and memory section 24, enabling data to be input/output to/from the memory section 24. Accordingly, the electronic equipment 1 is permitted to read out data from the memory section 24. The USB 2.0 host controller 11 and USB 2.0 device controller 23 subsequently starts data transmission in accordance with USB 2.0 between the electronic equipment 1 and USB flash drive 2 through the signal lines 14, 14, 14 and the signal lines 26, 26, 26 (S16). More specifically, data is read out from the memory section 24. The electronic equipment 1 and USB flash drive 2 then terminate the processing performed when they are connected to each other.

If, at step S14, the limitation level does not fall within the range which permits data to be read out (S14: NO), the limitation processing section 21 makes the switching section 22 cut off the electric power supplied from the power supply 12 to the USB 2.0 device controller 23 and memory section 24 (S17). More specifically, the limitation processing section 21 makes the switching section 22 configured with FET switch to the "off" state. The electric power is not supplied to the USB 2.0 device controller 23 and memory section 24, disabling the operation of the USB 2.0 device controller 23 and memory section 24. Thus, data read-out from the memory section 24 by the electronic equipment 1 is prohibited. Thereafter, the CPU 16 may perform processing of notifying the user of prohibition of data read-out by, for example, showing an image indicating that data transmission with the USB flash drive 2 is not possible on a display (not shown). The electronic equipment 1 and USB flash drive 2 then terminates the processing performed when they are connected with each other.

As specifically described above, in the present embodiment, the processing of limiting the electronic equipment 1 in reading out data from the USB flash drive 2 is executed at the side of USB flash drive 2 based on the setting of the electronic equipment 1. Data read-out is prohibited when the setting at the electronic equipment 1 does not match with the condition for permitting data read-out that has been determined for the USB flash drive 2, preventing data to be read out from the USB flash drive 2 by unidentified electronic equipment and thus preventing unauthorized data leakage. As the processing for limiting data read-out is executed at the side of USB flash drive 2, it is not necessary for the electronic equipment 1 to execute any special software and thus troublesome work is avoided. This can, therefore, easily prevent unauthorized leakage of data. Furthermore, because the processing is executed at the side of the USB flash drive 2, the limitation of, for example, OS in the electronic equipment 1 can be reduced. This further reduces disturbance in using the present invention, allowing the invention to be applied to a number of electronic equipment systems and thus reliably reducing unauthorized leakage of data.

According to the present embodiment, when data reading is prohibited, power is stopped being supplied to the USB 2.0 device controller 23 and the memory section 24. This makes it impossible to read out data, reliably prohibiting data read-out. Moreover, in the present embodiment, the USB flash drive 2 ascertains, when it is connected to the electronic equipment 1, the limitation level set at the electronic equipment 1 through signal lines 27, 27, . . . , and executes the processing for limiting data read-out by hardware. Since the process of limiting data read-out is surely executed when the USB flash drive 2 is connected to the electronic equipment 1, the present invention has an enhanced security compared to the technique that limits data read-out by software.

Embodiment 2

Figure 7:
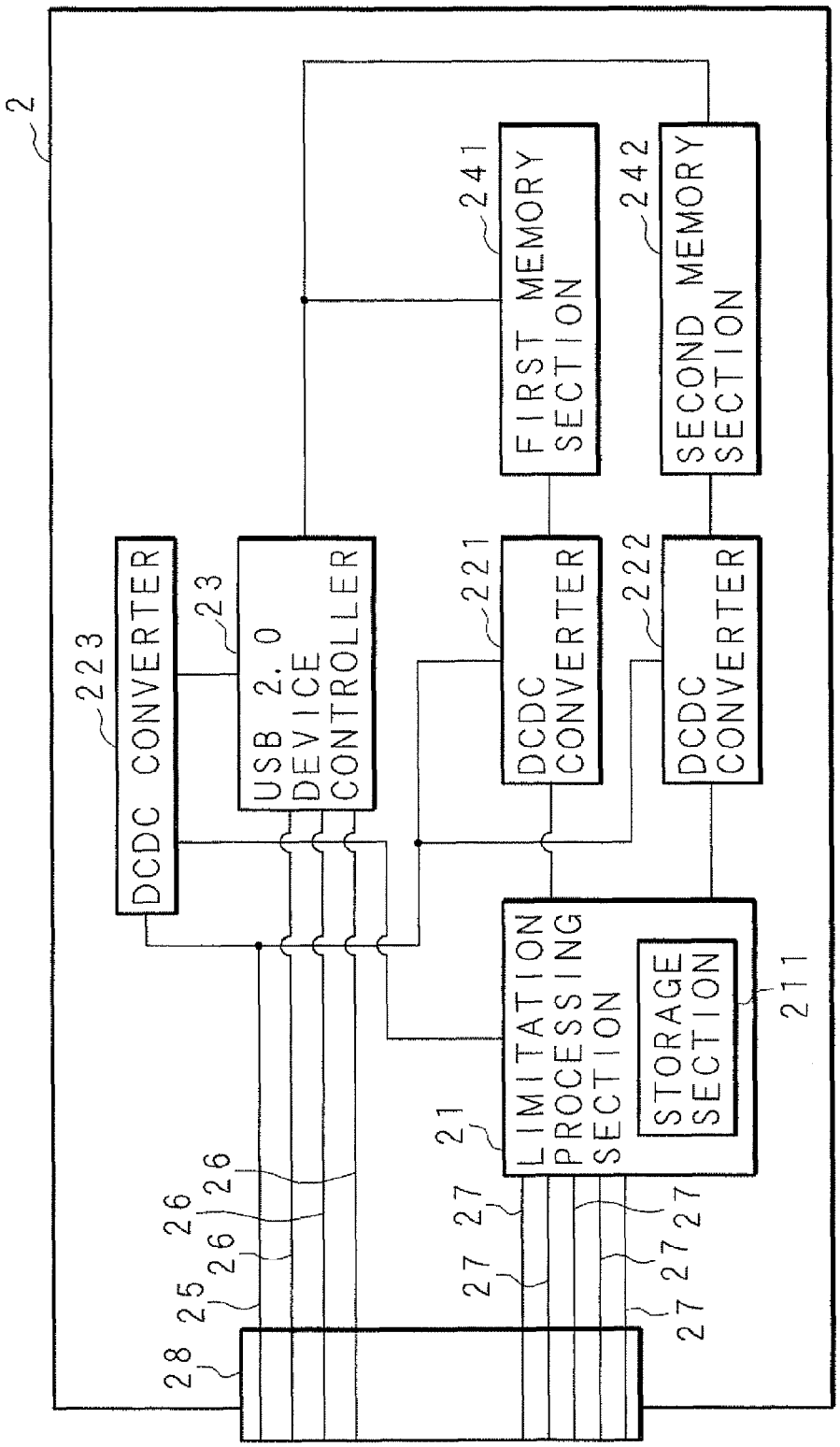
FIG. 7 is a block diagram illustrating the internal functional configuration of a USB flash drive included in an electronic equipment system according to Embodiment 2.

FIG. 7 is a block diagram illustrating the internal functional configuration of the USB flash drive 2 included in an electronic equipment system according to Embodiment 2. The internal functional configuration of the electronic equipment 1 is similar to that in Embodiment 1. The USB flash drive 2 includes two memory sections of the first memory section 241 and the second memory section 242 as data storing sections in the present invention. Each of the first memory section 241 and the second memory section 242 corresponds to a non-volatile memory such as a flash memory or the like. The first memory section 241 and the second memory section 242 are connected to the USB 2.0 device controller 23.

The power line 25 is connected to DCDC converters 221, 222 and 223 for converting the direct-current voltage of power supplied through the power line 25. The USB 2.0 device controller 23 is connected to the DCDC converter 223 and is supplied power from the DCDC converter 223. The first memory section 241 is connected to the DCDC converter 221 and is supplied power from the DCDC converter 221. The second memory section 242 is connected to the DCDC converter 222 and is supplied power from the DCDC converter 222. The DCDC converters 221, 222 and 223 are in a halt state when the USB flash drive 2 is not connected to the electronic equipment 1. Each of the DCDC converters 221, 222 and 223 is connected to the limitation processing section 21, which controls the operation of each of the DCDC converters 221, 222 and 223. As the other functional configurations of the USB flash drive 2 are similar to those in Embodiment 1, the corresponding parts are denoted by the same reference codes and will not be described here in detail.

FIG. 8 is a conceptual view illustrating an example of contents stored in the storage section 211 in Embodiment 2, showing a range of limitation level for permitting data read-out from each of the first memory section 241 and the second memory section 242. Stored in the storage section 211 is information indicating the range of limitation level for permitting the electronic equipment 1 to read out data from the first memory section 241 and the second memory section 242. In the example shown in FIG. 8, if the signals indicating the limitation level correspond to {1, 1, 1, 1, 1}, data reading is permitted from all the memory sections of the first memory section 241 and the second memory section 242. If the signals indicating the limitation level are in the range between {1, 1, 1, 1, 0} and {0, 1, 1, 1, 1}, data reading is permitted only from the first memory section 241. If the signals indicating the limitation level are in the range between {1, 1, 1, 0, 0} and {0, 1, 1, 1, 0}, data reading is permitted only from the second memory section 242. If the signals indicating the limitation level correspond to other signals, data reading is prohibited both from the first memory section 241 and from the second memory section 242. Moreover, in the case where the setting section 3 is configured with a non-volatile memory, the storage section 211 stores, for example, specific data regarding the limitation level for permitting the electronic equipment 1 to read out data from each of the first memory section 241 and the second memory section 242.

Figure 9:
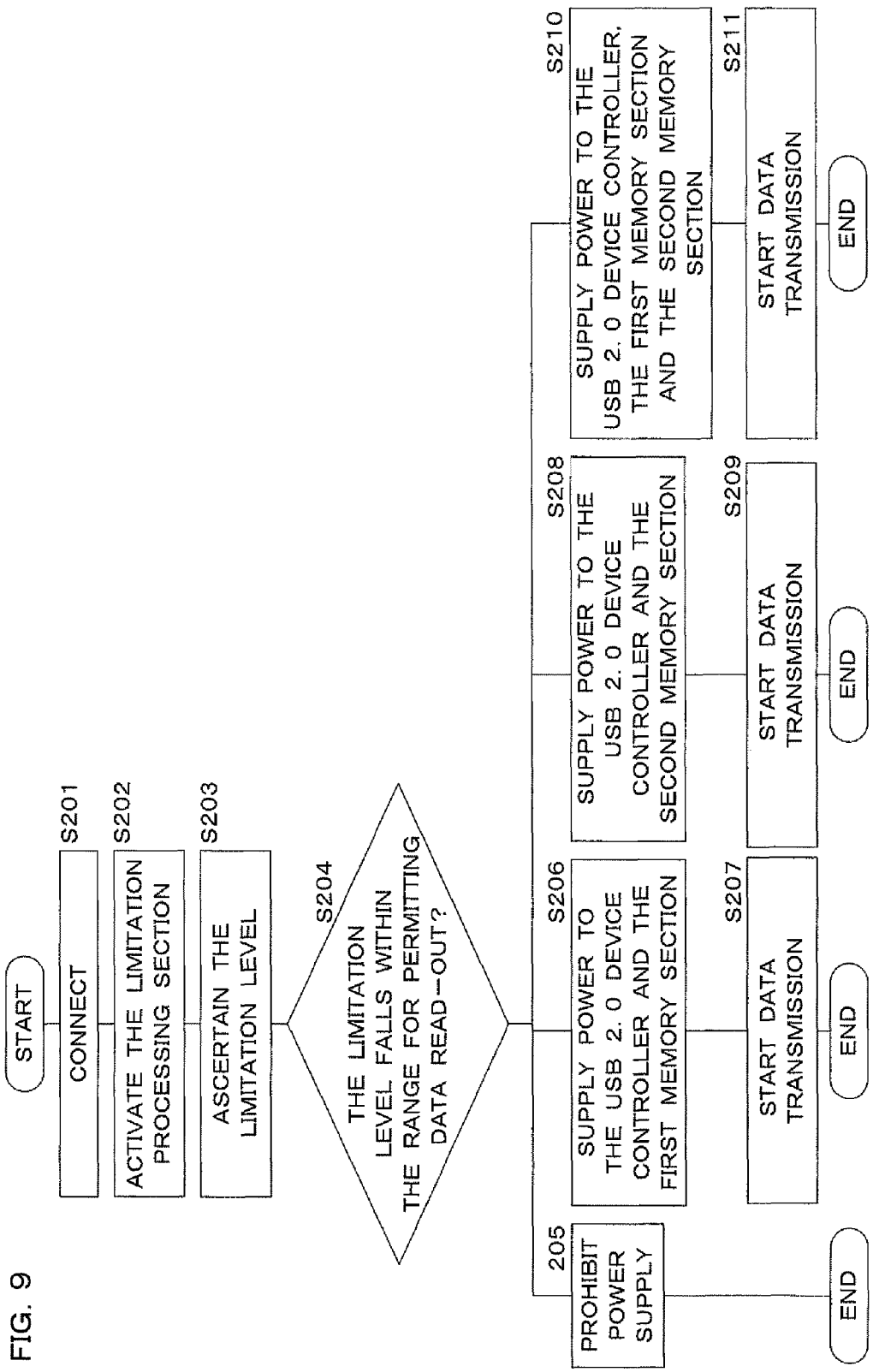
FIG. 9 is a flowchart illustrating the procedure of processing performed when a USB flash drive is connected to the electronic equipment in Embodiment 2.

FIG. 9 is a flowchart illustrating the procedure of processing performed when the USB flash drive 2 is connected to the electronic equipment 1 in Embodiment 2. The USB flash drive 2 is connected to the electronic equipment 1 (S201). Power is supplied from the power supply 12 to the limitation processing section 21 to activate the limitation processing section 21 (S202). The limitation processing section 21 ascertains the limitation level set at the setting section 3 through the connected signal lines 27, 27, . . . (S203). The limitation processing section 21 subsequently refers to the contents stored in the storage section 211 to determine whether or not the ascertained limitation level falls within the range for permitting data read-out from either the first memory section 241 or the second memory section 242 (S204).

At step S204, if the ascertained limitation level does not fall in any range for permitting data read-out from each of the memory sections, the limitation processing section 21 stops the DCDC converter 223 to prohibit power supply to the USB 2.0 device controller 23 (S205). The USB 2.0 device controller 23 performing data transmission is inactivated, prohibiting the electronic equipment 1 from reading out data from the first memory section 241 and the second memory section 242. Thereafter, the CPU 16 may perform the processing of notifying the user that data read-out is prohibited. This terminates the processing performed when the electronic equipment 1 is connected to the USB flash drive 2.

At step S204, if the ascertained limitation level falls within the range for permitting data read-out from the first memory section 241, the limitation processing section 21 performs processing for supplying electric power to the USB 2.0 device controller 23 and the first memory section 241 (S206). More specifically, the limitation processing section 21 activates the DCDC converter 223 and the DCDC converter 221, and stops the DCDC converter 222. Electric power is supplied to the USB 2.0 device controller 23 and the first memory section 241, to allow the first memory section 241 to be accessed. This permits data stored in the first memory section 241 to be read out. Furthermore, the second memory section 242 cannot be accessed because no power is supplied to the second memory section 242. This prohibits reading data stored in the second memory section 242. The USB 2.0 host controller 11 and the USB 2.0 device controller 23 then start data transmission in accordance with USB 2.0 between the electronic equipment 1 and the USB flash drive 2 (S207). More specifically, data is read out from the first memory section 241. This terminates the processing performed when the electronic equipment 1 is connected to the USB flash drive 2.

At step S204, if the ascertained limitation level falls within the range for permitting data read-out from the second memory section 242, the limitation processing section 21 performs processing for supplying power to the USB 2.0 device controller 23 and the second memory section 242 (S208). More specifically, the limitation processing section 21 activates the DCDC converter 223 and the DCDC converter 222, and stops the DCDC converter 221. Electric power is supplied to the USB 2.0 device controller 23 and the second memory section 242 to allow the second memory section 242 to be accessed. This permits data stored in the second memory section 242 to be read out. Furthermore, the first memory section 241 cannot be accessed because no power is supplied to the first memory section 241. This prohibits reading data stored in the first memory section 241. The USB 2.0 host controller 11 and the USB 2.0 device controller 23 subsequently start data transmission in accordance with USB 2.0 between the electronic equipment 1 and the USB flash drive 2 (S209). More specifically, data is read out from the second memory section 242. This terminates the processing performed when the electronic equipment 1 is connected to the USB flash drive 2.

At step S204, if the ascertained limitation level falls in the range for permitting data read-out from all the memory sections, the limitation processing section 21 performs processing for supplying power to the USB 2.0 device controller 23, the first memory section 241 and the second memory section 242 (S210). More specifically, the limitation processing section 21 activates the DCDC converters 221, 222 and 223. Electric power is supplied to the USB 2.0 device controller 23, the first memory section 241 and the second memory section 242, to allow the first memory section 241 and the second memory section 242 to be accessed. This permits the data stored in the first memory section 241 and the second memory section 242 to be read out. The USB 2.0 host controller 11 and the USB 2.0 device controller 23 subsequently start data transmission in accordance with USB 2.0 between the electronic equipment 1 and the USB flash drive 2 (S211). More specifically, data is read out from the first memory section 241 and the second memory section 242. This terminates the processing performed when the electronic equipment 1 is connected to the USB flash drive 2.

As has been described above, in the present embodiment, the USB flash drive 2 includes plural memory sections and individually limits data read-out from each memory section based on the setting for the electronic equipment 1. This can prevent unauthorized electronic equipment from reading out data from the USB flash drive 2, while also limiting in multiple stages legitimate electronic equipment 1 regarding its authorization for reading out data. For example, in a business institution, the range of data to be read out from the USB flash drive 2 can be differentiated between the electronic equipment 1 used by a general employee and that used by a manager, to prevent unauthorized leakage of data in the business institution. Also in the present embodiment, power is individually stopped supplying to each memory section when data read-out from each memory section is prohibited, reliably prohibiting data read-out from each memory section.

Though the present embodiment showed the configuration where the USB flash drive 2 includes the first memory section 241 and the second memory section 242, it may also be possible that the USB flash drive 2 includes three or more memory sections, each of which is limited by the limitation processing section 21 for data read-out. Moreover, though Embodiments 1 and 2 showed the configuration where power supplied to the memory section is cut off in order to prohibit data read-out from the memory section, the present invention may also employ another method to prohibit data read-out from the memory section. For example, the USB flash drive 2 may have a configuration in that data can be written to the memory section while data cannot be read out from the memory section, when data read-out from the memory section is prohibited. Furthermore, though Embodiments 1 and 2 described above illustrated the storage device of the present invention as a USB flash drive, it may also be a hard disk drive. Moreover, through Embodiments 1 and 2 described above illustrated the configuration where the electronic equipment and the storage device are connected via USB 3.0 while data transmission between them is performed in accordance with USB 2.0, the present invention may also utilize an interface other than USB 2.0 and USB 3.0.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic equipment system, comprising:
   an electronic equipment; and
   a storage device to be connected to the electronic equipment which reads data from the storage device,
   wherein the electronic equipment includes
      a setting section having set a limitation level on reading out data from the storage device, and
   the storage device includes
      a limitation storage section for storing one or more values of a limitation level for permitting reading data,
      an ascertainment section for ascertaining the limitation level set at the setting section when the storage device is connected to the electronic equipment, and
      a limitation section for limiting reading data in accordance with the limitation level ascertained by the ascertainment section and the one or more values stored by the limitation storage section.

2. The electronic equipment system according to claim 1, wherein the limitation section includes
   a permission section for permitting reading data if the limitation level ascertained by the ascertainment section is consistent with the one or more values, and
   a prohibition section for prohibiting reading data if the limitation level ascertained by the ascertainment section is not consistent with the one or more values.

3. The electronic equipment system according to claim 2, wherein the electronic equipment further includes
   a first power supply section for supplying electric power to the storage device connected to the electronic equipment,
   the storage device further includes,
      a data output section for reading out data and outputting the data to the electronic equipment, and
      a second power supply section that is connected to the first power supply section when the storage device is connected to the electronic equipment, for supplying electric power from the first power supply section to the data output section,
   wherein
      the data output section is operated by electric power supplied from the second power supply section, and
      the second power supply section switches between supplying and cutting of electric power to the data output section,
      the permission section makes the second power supply section supply electric power to the data output section if the limitation level ascertained by the ascertainment section is consistent with the one or more values, thereby allowing the data output section to read out data, and
      the prohibition section makes the second power supply section cut power to the data output section if the limitation level ascertained by the ascertainment section is not consistent with the one or more values, thereby not allowing the data output section to read out data.

4. The electronic equipment system according to claim 1, wherein the storage device further includes
   a plurality of data storage sections,
   the limitation storage section stores some values of a limitation level for permitting reading data from each of the plurality of data storage sections, and the limitation section includes
- a permission section for permitting reading data from one or more specific data storage sections included in the plurality of data storage sections and for prohibiting reading data from other data storage sections which are not included in the one or more specific data storage sections among the plurality of data storage sections if the limitation level ascertained by the ascertainment section is consistent with the one or more values of the limitation level for permitting reading data from the specific data storage sections, and
- a prohibition section for prohibiting reading data from the plurality of data storage sections if the limitation level ascertained by the ascertainment section is not consistent with the one or more values of the limitation level for permitting reading data from each of the plurality of data storage sections.

5. A storage device from which data is read out by external equipment, comprising:
- an ascertainment section for ascertaining a limitation level set at the external equipment;
- a limitation storage section for storing one or more values of a limitation level for permitting reading data; and
- a limitation section for limiting reading data in accordance with the limitation level ascertained by the ascertainment section and the one or more values stored by the limitation storage section.

* * * * *